(12) United States Patent
Kimura et al.

(10) Patent No.: US 10,462,520 B2
(45) Date of Patent: Oct. 29, 2019

(54) PACING CONTROL DEVICE, PACING CONTROL METHOD, AND PROGRAM

(71) Applicant: NIPPON TELEGRAPH AND TELEPHONE CORPORATION, Chiyoda-ku (JP)

(72) Inventors: Takuto Kimura, Musashino (JP); Arifumi Matsumoto, Musashino (JP); Masahiro Yokota, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/076,635

(22) PCT Filed: Feb. 9, 2017

(86) PCT No.: PCT/JP2017/004803
§ 371 (c)(1),
(2) Date: Aug. 8, 2018

(87) PCT Pub. No.: WO2017/145781
PCT Pub. Date: Aug. 31, 2017

(65) Prior Publication Data
US 2019/0052931 A1 Feb. 14, 2019

(30) Foreign Application Priority Data
Feb. 25, 2016 (JP) ................................ 2016-034730

(51) Int. Cl.
*H04N 7/173* (2011.01)
*H04N 21/442* (2011.01)
(Continued)

(52) U.S. Cl.
CPC ..... *H04N 21/44209* (2013.01); *H04N 21/437* (2013.01); *H04N 21/442* (2013.01); *H04N 21/64738* (2013.01)

(58) Field of Classification Search
None
See application file for complete search history.

(56) References Cited

U.S. PATENT DOCUMENTS

| 5,668,948 A * | 9/1997 | Belknap | H04H 20/42 |
| | | | 348/552 |
| 5,712,976 A * | 1/1998 | Falcon, Jr. | G06F 3/0601 |
| | | | 348/E5.008 |

(Continued)

FOREIGN PATENT DOCUMENTS

| JP | 2011-15273 A | 1/2011 |
| JP | 2014-127890 A | 7/2014 |

OTHER PUBLICATIONS

International Search Report dated May 16, 2017, in PCT/JP2017/004803 filed Feb. 9, 2017.

(Continued)

*Primary Examiner* — William J Kim
(74) *Attorney, Agent, or Firm* — Oblon, McClelland, Maier & Neustadt, L.L.P.

(57) ABSTRACT

A pacing control device to perform pacing control on a content distributed from a content distribution device that performs streaming-based content distribution, includes an obtainer configured to obtain a communication quality threshold that corresponds to a communication environment in the pacing control device; and a controller configured not to make a request for the content to the content distribution device in a case where a communication quality in the pacing control device is lower than the communication quality threshold, and to make the request for the content to (Continued)

the content distribution device in a case where the communication quality is higher than the communication quality threshold.

8 Claims, 7 Drawing Sheets

(51) Int. Cl.
*H04N 21/437* (2011.01)
*H04N 21/647* (2011.01)

(56) References Cited

U.S. PATENT DOCUMENTS

| | | | | |
|---|---|---|---|---|
| 6,765,931 | B1* | 7/2004 | Rabenko | H04B 3/23 |
| | | | | 348/E7.049 |
| 7,665,113 | B1* | 2/2010 | Abrams | H04N 21/23406 |
| | | | | 725/114 |
| 2003/0009762 | A1* | 1/2003 | Hooper | G06Q 30/02 |
| | | | | 725/91 |
| 2003/0056217 | A1* | 3/2003 | Brooks | H04N 7/106 |
| | | | | 725/46 |
| 2007/0115889 | A1* | 5/2007 | Song | H04N 7/1675 |
| | | | | 370/331 |
| 2009/0025027 | A1* | 1/2009 | Craner | H04H 20/103 |
| | | | | 725/32 |
| 2009/0031384 | A1* | 1/2009 | Brooks | H04N 21/23439 |
| | | | | 725/127 |
| 2009/0271818 | A1* | 10/2009 | Schlack | G08B 27/008 |
| | | | | 725/33 |
| 2010/0020770 | A1* | 1/2010 | Qin | H04N 21/2381 |
| | | | | 370/336 |
| 2010/0299552 | A1* | 11/2010 | Schlack | H04L 47/10 |
| | | | | 714/4.1 |
| 2012/0079062 | A1* | 3/2012 | Fonseca, Jr. | H04N 7/17318 |
| | | | | 709/217 |
| 2013/0167181 | A1* | 6/2013 | Dixit | H04N 21/6131 |
| | | | | 725/95 |
| 2013/0322242 | A1* | 12/2013 | Swenson | H04L 47/11 |
| | | | | 370/232 |
| 2014/0006951 | A1* | 1/2014 | Hunter | H04H 60/31 |
| | | | | 715/719 |
| 2014/0025837 | A1* | 1/2014 | Swenson | H04L 29/06027 |
| | | | | 709/231 |
| 2014/0185439 | A1 | 7/2014 | Sakurai et al. | |
| 2014/0282811 | A1* | 9/2014 | Lohmar | H04L 65/80 |
| | | | | 725/146 |
| 2015/0032899 | A1* | 1/2015 | Willars | H04L 65/4076 |
| | | | | 709/231 |
| 2015/0120876 | A1* | 4/2015 | Parthasarathy | H04N 21/2401 |
| | | | | 709/219 |
| 2015/0121410 | A1* | 4/2015 | Yousaf | H04N 21/44204 |
| | | | | 725/21 |

OTHER PUBLICATIONS

Satoda, K. et al., "Adaptive Video Pacing Method Based on the Prediction of Stochastic TCP Throughput", Global Communications Conference (GLOBECOM), 2012 IEEE, 2012, pp. 1944-1950.

* cited by examiner

| TIME SLOT | WIRELESS LAN USE DETERMINATION | ISP | CARRIER | BASE STATION ID | CELL ID | THROUGHPUT THRESHOLD |
|---|---|---|---|---|---|---|
| 10 | True | ISP-A | CARRIER A | 205511 | 111 | 1650 |
| 11 | False | * | CARRIER B | 201333 | 101 | 1000 |
| 11 | False | * | CARRIER A | 205511 | 110 | 1800 |
| 11 | False | * | CARRIER A | 205511 | * | 1500 |

FIG.6

| TIME | SESSION ID | TIME SLOT | WIRELESS LAN USE DETERMINATION | ISP | CARRIER | BASE STATION ID | CELL ID | THROUGH-PUT |
|---|---|---|---|---|---|---|---|---|
| 2016/01/01 12:30:11 | 0abj | 12 | True | ISP-A | CARRIER A | 205511 | 111 | 1650 |
| 2016/01/01 12:30:12 | 0abj | 12 | True | ISP-A | CARRIER A | 205511 | 111 | 1200 |
| 2016/01/01 12:30:13 | 0abj | 12 | True | ISP-A | CARRIER A | 205511 | 111 | 1100 |
| 2016/01/01 12:30:14 | 0abj | 12 | True | ISP-A | CARRIER A | 205511 | 111 | 1800 |
| 2016/01/02 00:12:34 | adbr | 00 | False | * | CARRIER A | 102938 | 101 | 1500 |
| 2016/01/02 00:12:35 | adbr | 00 | False | * | CARRIER A | 102938 | 101 | 1200 |
| 2016/01/02 00:12:36 | adbr | 00 | False | * | CARRIER A | 102938 | 101 | 300 |
| 2016/01/02 00:12:37 | adbr | 00 | False | * | CARRIER A | 102938 | 101 | 500 |

FIG.7

PACING CONTROL DEVICE, PACING CONTROL METHOD, AND PROGRAM

TECHNICAL FIELD

The present invention relates to pacing control in streaming-based content distribution.

BACKGROUND ART

In recent years, use of content distribution services such as video distribution services and music distribution services has become widespread. Among these services, there exist download-based distribution services in which entire data for a playback is first downloaded into a playback terminal before performing the playback, and streaming-based distribution services in which a playback is performed simultaneously with downloading the data.

Among these services, compared to the download-based distribution services, the streaming-based distribution service generally takes a shorter time to make a video ready to be viewed and listened to, and hence, a large number of users use streaming-based distribution services. Also, progress of the adaptive bitrate technology that dynamically changes the image quality depending on the communication environment makes streaming-based distribution services widely used in mobile environments. Meanwhile, in a streaming-based distribution service, since the service can be used easily, it is quite often the case that the user suspends viewing. In such a case, since data that has been accumulated in a buffer until the viewing is suspended is discarded without being viewed, the traffic turns out to be useless.

Thereupon, what-is-called "pacing technologies" have been proposed that control the buffered amount of data so as not to be accumulated excessively within a range where playback stalling does not occur. Pacing technologies that have been proposed include a method that sets two thresholds (denoted as $Th_a$ and $Th_b$), to stop buffering more if the buffered amount reaches $Th_a$, and to resume buffering if the buffered amount decreases to $Th_b$; and a method that predicts a stochastic spread of the throughput, to prevent playback stalling (Non-patent document 1).

RELATED ART DOCUMENTS

Non-Patent Documents

Non-patent document 1: Satoda, K.; Yoshida, H.; Ito, H.; Ozawa, K., "Adaptive video pacing method based on the prediction of stochastic TCP throughput" in Global Communications Conference (GLOBECOM), 2012 IEEE, vol., no., pp. 1944-1950, 3-7 Dec. 2012

SUMMARY OF INVENTION

Problem to be Solved by the Invention

However, the conventional technology has, for example, the following two problems.

First, in the case where the communication quality is poor, the conventional technology excessively collects data transferred at a low bit rate in the buffer. In the case where the communication quality is poor, a bit rate selection algorithm follows the communication quality at the moment, to select a low bit rate. In such a case, an existing pacing algorithm may receive data of this low bit rate up to an upper limit of the buffered amount, and thereby, even if the communication quality improves later, data transferred at a higher bit rate cannot be received. Consequently, the average bit rate falls, and the viewing quality (physically sensed quality) is impaired.

Second, in the case where the communication quality is high, the conventional technology cannot collect data of a high bit rate sufficiently in the buffer. The existing pacing algorithm stops receiving data for a while if the buffered amount reaches a predetermined value, or controls the buffered amount to be less than a limit of the buffered amount on a system. Therefore, even if the communication quality is high, it is not possible to collect data of a high bit rate sufficiently in the buffer. Consequently, the average bit rate falls and the viewing quality (physically sensed quality) is impaired as in the first problematic case.

The present invention is made in view of the above, and aims at providing a technology that enables to raise physically sensed quality felt by users who view and listen to contents distributed by streaming.

Means for Solving the Problem

According to an embodiment of the present invention, a pacing control device to perform pacing control on a content distributed from a content distribution device that performs streaming-based content distribution, includes an obtainer configured to obtain a communication quality threshold that corresponds to a communication environment in the pacing control device; and a controller configured not to make a request for the content to the content distribution device in a case where a communication quality in the pacing control device is lower than the communication quality threshold, and to make the request for the content to the content distribution device in a case where the communication quality is higher than the communication quality threshold.

Also, according to an embodiment of the present invention, a pacing control method executed by a pacing control device to perform pacing control on a content distributed from a content distribution device that performs streaming-based content distribution, includes an obtaining step of obtaining a communication quality threshold that corresponds to a communication environment in the pacing control device; and a controlling step of not making a request for the content to the content distribution device in a case where a communication quality in the pacing control device is lower than the communication quality threshold, and making a request for the content to the content distribution device in a case where the communication quality is higher than the communication quality threshold.

Advantage of the Invention

According to an embodiment of the present invention, a technology is provided that enables to raise physically sensed quality felt by users who view and listen to contents distributed by streaming.

EMBODIMENTS OF THE INVENTION

In the following, embodiments will be described with reference to the drawings. Note that the embodiments described below are merely examples, and an embodiment to which the present invention can be applied is not necessarily to be limited to the following embodiments. For example, in the present embodiment, although a video distribution service is taken for description, the present invention can be applied to content distribution services other than video distribution services, for example, music streaming services. Also, in an embodiment that will be described below, although the throughput is used to represent the communication quality, this is merely an example. Other than the throughput, radio wave strength, delay, jitter, information on the distance to a base station, and an indicator combining these may be used to represent the communication quality.

(Overall Configuration of System and Summary of Operations)

Figure 1:
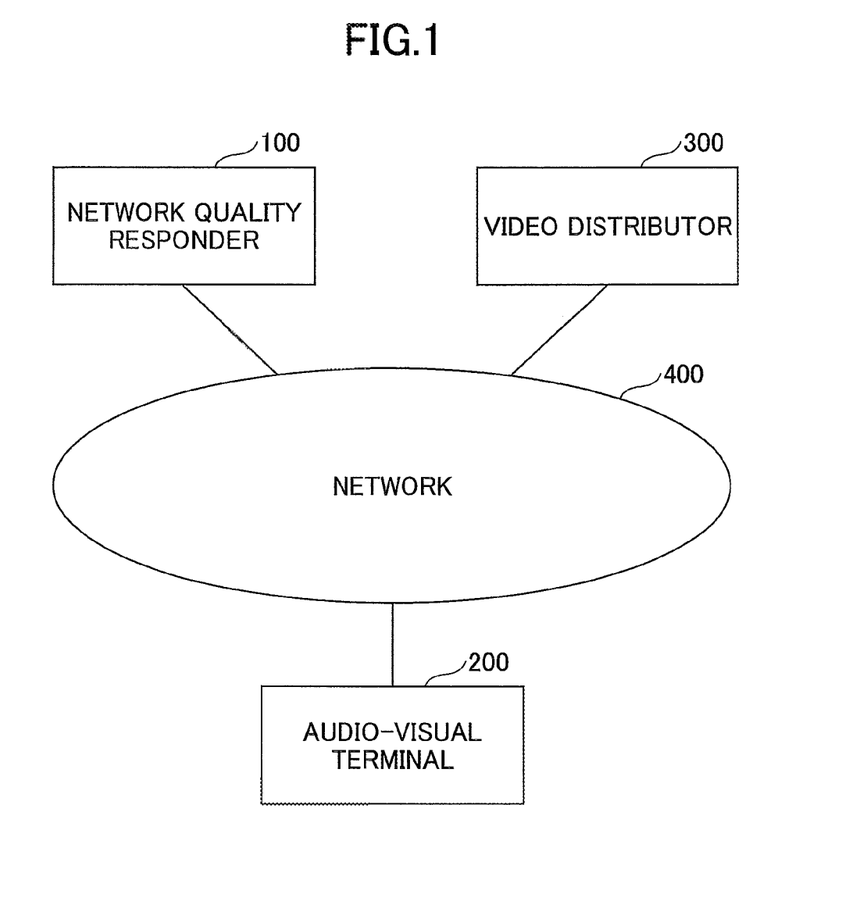
FIG. 1 is a configuration diagram of a video pacing control system in an embodiment of the present invention.

FIG. 1 illustrates a configuration diagram of a video pacing control system according to an embodiment of the present invention. As illustrated in FIG. 1, the video pacing control system in the present embodiment has a configuration that includes a network quality responder 100, an audio-visual terminal 200, and a video distributor 300, which are connected to a network 400. Although the network 400 is not limited to a specific type, it is assumed here to be a mobile network that includes a base station wirelessly connected with the audio-visual terminal 200.

Also, the video distributor 300 performs streaming-based video distribution. In the streaming-based video distribution, the video distributor 300 partitions video data into chunks of small data, to distribute the data. The audio-visual terminal 200 requests the chunks to the video distributor 300, to perform a playback properly while downloading the chunks. In the following, in principle, "video data" means the chunks.

The network quality responder 100 stores information on communication quality in various communication environments, and based on the communication quality, periodically calculates a communication quality threshold in each of the communication environments, and holds the thresholds. Note that since the audio-visual terminal 200 executes pacing control, the terminal may also be referred to as a pacing control device.

Figure 2:
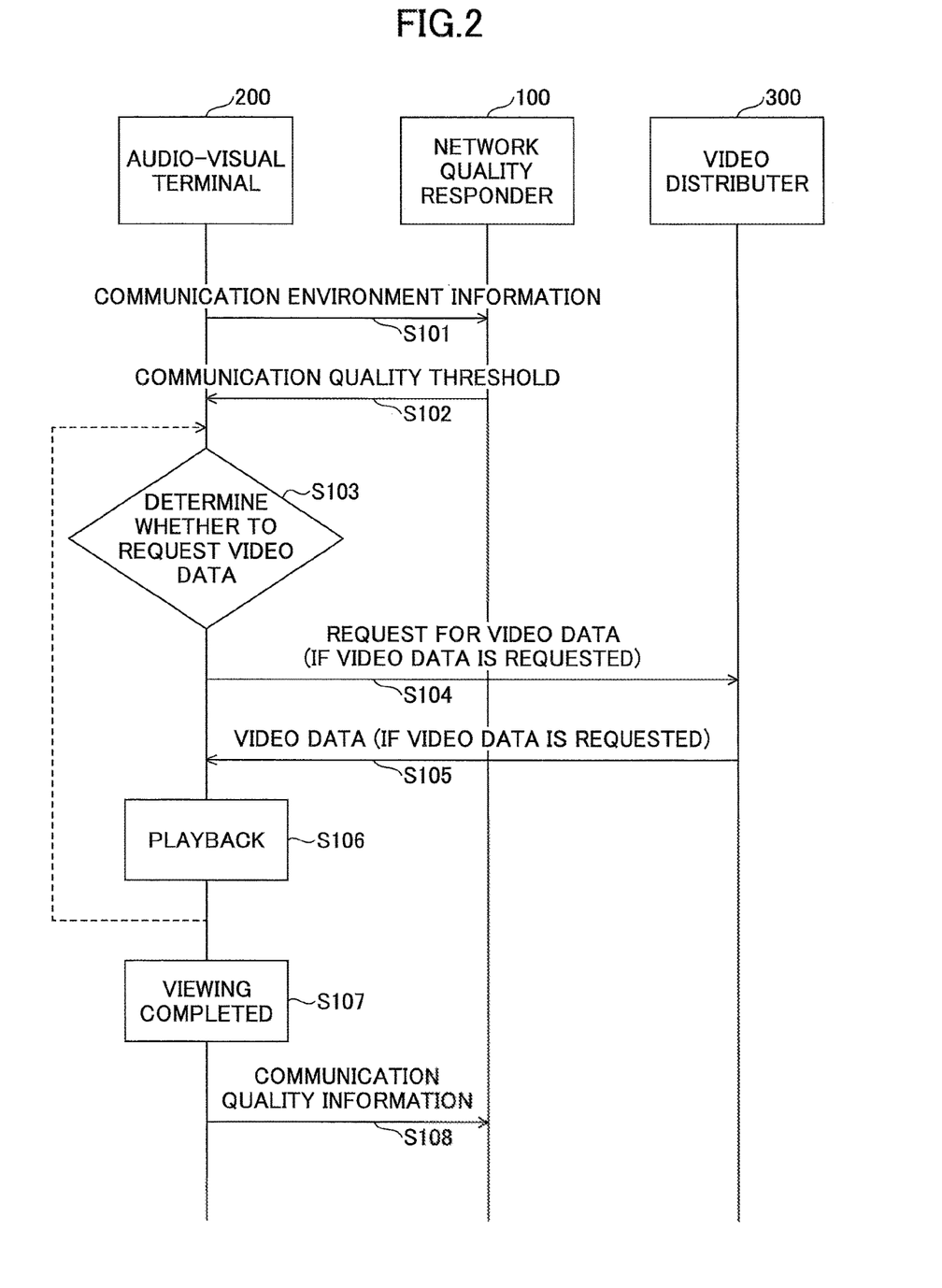
FIG. 2 is a sequence chart illustrating a flow of operations of a video pacing control system.

With reference to a sequence chart in FIG. 2, a flow of overall operations in the video pacing control system will be described.

When starting video-viewing, the audio-visual terminal 200 transmits current communication environment information in the audio-visual terminal 200 to the network quality responder 100 (Step S101).

After having received the communication environment information, the network quality responder 100 obtains a communication quality threshold corresponding to the communication environment of the audio-visual terminal 200 from among communication quality thresholds in various communication environments that are stored, to transmit the communication quality threshold to the audio-visual terminal 200 (Step S102).

Based on this communication quality threshold, the audio-visual terminal 200 determines whether to make a request for (a next chunk of) the video data to the video distributor 300 (Step S103).

More specifically, at Step S103, the audio-visual terminal 200 determines not to make a request for the video data if the current communication quality is less than or equal to the communication quality threshold, or the current buffered amount has reached an upper limit set in advance. However, even if the current communication quality is less than or equal to the communication quality threshold, if the current buffered amount has decreased down to a buffered amount threshold set in advance, the audio-visual terminal 200 determines to make a request for the video data.

Also, if the current communication quality is greater than or equal to the communication quality threshold, the audio-visual terminal 200 determines to make a request for the video data. However, as described above, even if the current communication quality is greater than or equal to the communication quality threshold, if the current buffered amount has reached the upper limit set in advance, the audio-visual terminal 200 determines not to make a request for the video data.

Note that in the above context, "less than or equal to" may be replaced with "less than", and "greater than or equal to" may be replaced with "greater than". In the present embodiment, "greater than or equal to" and "greater than" have substantially the same meaning in terms of the controlling; also, "less than or equal to", "below", and "less than" have substantially the same meaning.

In the case of making a request of the video data, the audio-visual terminal 200 issues the request for the video data to the video distributor 300 (Step S104), to receive the video data from the video distributor 300 (Step S105). Also, the audio-visual terminal 200 plays back the video data in the buffer (Step S106). Steps S103 to S106 are repeated at regular intervals while viewing the video.

The audio-visual terminal 200 measures the communication quality periodically (e.g., at time intervals to execute the determination of Step S103), to record the measured quality in the audio-visual terminal 200. At Step S107, when the viewing is completed, the audio-visual terminal 200 pairs a sequence of the communication quality (communication quality measured at each measuring time) with the communication environment information, and transmits the paired information to the network quality responder 100 (Step S108).

Based on the communication quality information received from the audio-visual terminal 200, the network quality responder 100 updates accumulated communication quality information, to raise precision of the communication quality threshold.

(Configurations of Devices)

Figure 3:
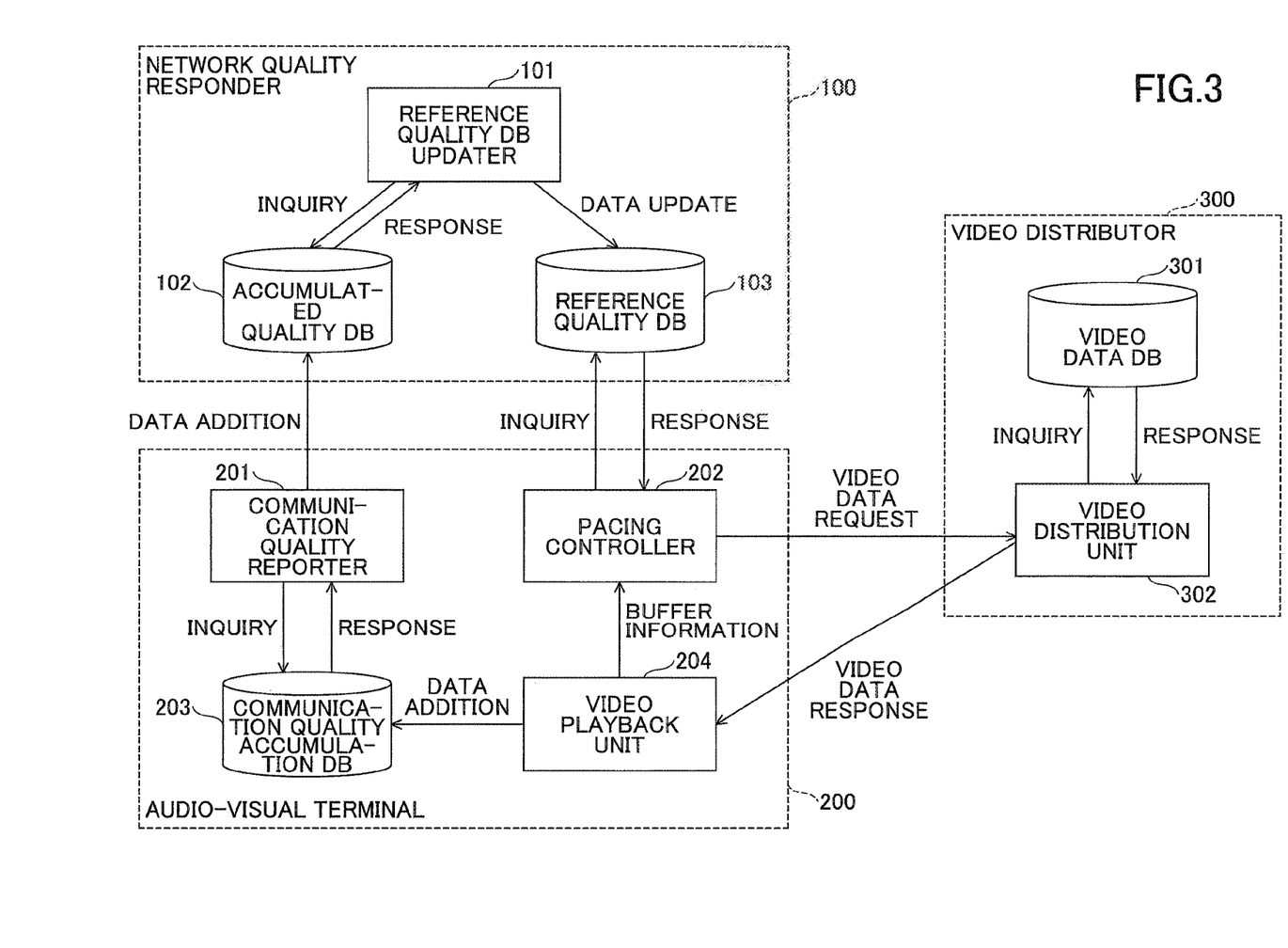
FIG. 3 is a diagram illustrating configurations of respective devices.

FIG. 3 is a diagram illustrating in detail configurations of the respective devices that constitute the video pacing control system.

As illustrated in FIG. 3, the network quality responder 100 includes a reference quality DB updater 101, an accumulated quality DB 102, and a reference quality DB 103. The reference quality DB updater 101 calculates a communication quality threshold based on the communication quality information accumulated in the accumulated quality DB 102, and stores (updates) the calculated communication quality threshold in the reference quality DB 103.

The accumulated quality DB 102 stores communication quality information collected from each audio-visual terminal, which is associated with the communication environment information, and in response to a request (an inquiry) from the reference quality DB updater 101, returns the communication quality information. The reference quality DB stores the communication quality threshold calculated by the reference quality DB updater 101, which is associated with the communication environment information, and in response to a request (an inquiry) from an audio-visual terminal 200, returns a communication quality threshold.

The audio-visual terminal 200 includes a communication quality reporter 201, a pacing controller 202, a communication quality accumulation DB 203, and a video playback unit 204. The communication quality reporter 201 reports communication quality information along with communication environment information, to the network quality responder 100. The pacing controller 202 determines whether to make a request for video data, based on a communication quality threshold and the like. The communication quality accumulation DB 203 stores information of communication quality measured by the video playback unit 204.

The video playback unit 204 plays back and displays the video data (encoded data) received from the video distributor 300. The video playback unit 204 has a buffer to accumulate the video data received from the video distributor 300, and performs a playback by reading out the video data from the buffer. Also, the video playback unit 204 includes a function to transfer the buffered amount (the size of the video data accumulated in the buffer) to the pacing controller 202.

The video distributor 300 includes a video data DB 301 and a video distribution unit 302. The video data DB 301 stores video data. Based on a request for video data from the audio-visual terminal 200, the video distribution unit 302 obtains the video data from the video data DB 301, and transmits the data to the audio-visual terminal 200.

Note that the network quality responder 100 and the video distributor 300 may be unified in a single device. In other words, functions of the video distributor 300 may be included in the network quality responder 100, or functions of the network quality responder 100 may be included in the video distributor 300.

The network quality responder 100 in the present embodiment can be implemented by causing a computer to execute a program that describes contents of processes explained in the present embodiment. In other words, functions included in the network quality responder 100 can be implemented by running the program that corresponds to processes executed on the network quality responder 100, by using hardware resources built in the computer, such as a CPU and a memory. The above program may be recorded on a computer-readable recording medium (a portable memory etc.) so as to be saved or distributed. Also, the above program may be provided through a network such as the Internet and by using e-mail.

Similarly, the audio-visual terminal 200 according to the present embodiment can be implemented, for example, by causing a terminal that includes a computers (a CPU, a memory, etc.), such as a smart phone or a tablet, to execute a program that describes contents of processes explained in the present embodiment. In other words, functions included in the audio-visual terminal 200 can be implemented by running the program that corresponds to processes executed on the audio-visual terminal 200, by using hardware resources built in the computer, such as a CPU and a memory. The above program may be recorded on a computer-readable recording medium (a portable memory etc.) so as to be saved or distributed. Also, the above program may be provided through a network such as the Internet and by using e-mail.

Figure 4:
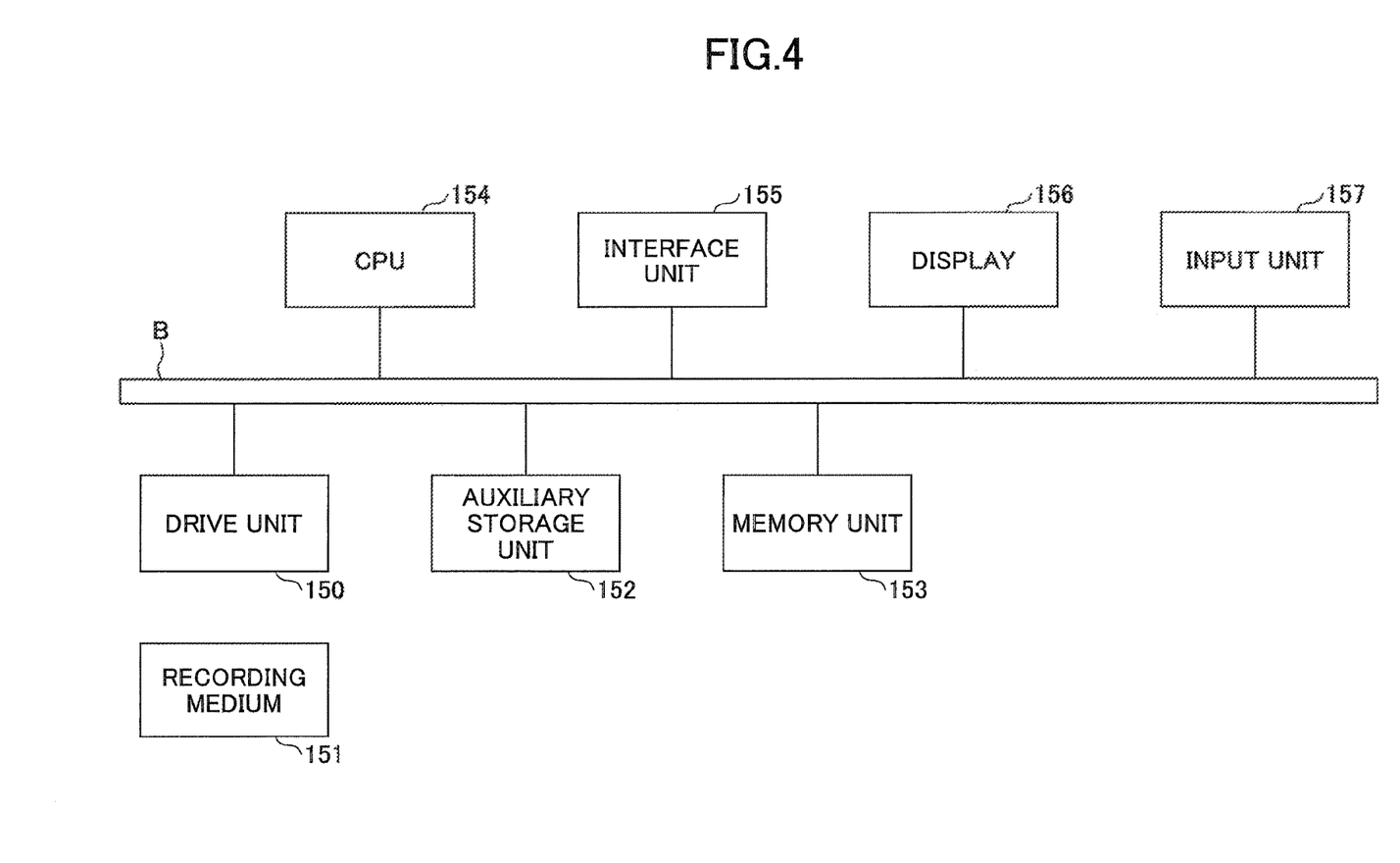
FIG. 4 is an example of a hardware configuration of a network quality responder 100 and an audio-visual terminal 200.

FIG. 4 is a diagram illustrating an example of a hardware configuration of these devices in the case where the network quality responder 100 and the audio-visual terminal 200 are implemented by computers. FIG. 4 shows an example of a hardware configuration that can be applied to either of the network quality responder 100 or the audio-visual terminal 200. The device illustrated in FIG. 4 includes a drive unit 150, an auxiliary storage unit 152, a memory unit 153, a CPU 154, an interface unit 155, a display 156, and an input unit 157, which are connected with each other by a bus B.

A program that implements processes in the device is provided, for example, by a recording medium 151 such as a CD-ROM or a memory card. Once the recording medium 151 storing the program is set in the drive unit 150, the program is installed into the auxiliary storage unit 152 from the recording medium 151 via the drive unit 150. However, installation of the program is not necessarily executed from the recording medium 151, and may also be downloaded from another computer via the network. The auxiliary storage unit 152 stores the installed program, and stores required files, data, and the like as well.

Upon receiving a command to activate the program, the memory unit 153 reads out the program from the auxiliary storage unit 152, to load the program. The CPU 154 implements functions that relate to the corresponding device following the program stored in the memory unit 153. The interface unit 155 is used as an interface for connecting with the network. The display 156 displays a GUI (Graphical User Interface) and the like by the program. The input unit 157 is constituted with a keyboard, a mouse, buttons, a touch panel, and the like, which are used for inputting various operation commands.

In the following, operations related to update of the reference quality DB 103 in the network quality responder 100; operations of pacing control in the audio-visual terminal 200 while a video is being viewed; and operations to update the accumulated quality DB 102 in the network quality responder 100, will be described in detail.

(Operation Related to Update of Reference Quality DB 103)

As described above, communication quality thresholds associated with respective communication environment information items, are stored in the reference quality DB 103. In other words, it is possible to obtain a communication quality threshold from the reference quality DB 103 by using a communication environment information item as the key.

In the present embodiment, a communication environment information item is represented by a tuple of <time slot, wireless LAN use determination, ISP, carrier, base station ID, cell ID>; and in principle, a communication quality threshold is stored for each condition in which all of these elements are satisfied.

However, a data item may be stored that has don't-care terms (*) in a part of the elements among the communication environment information. Upon a request for a communication quality threshold from the audio-visual terminal 200 using a communication environment information item, in the case where no data item is hit with the finest granularity, the reference quality DB 103 responds with a communication quality threshold obtained by treating some of the elements as don't-care terms. Note that representing the communication environment information by such a tuple of <time slot, wireless LAN use determination, ISP, carrier, base station ID, cell ID> is merely an example.

Figure 5:
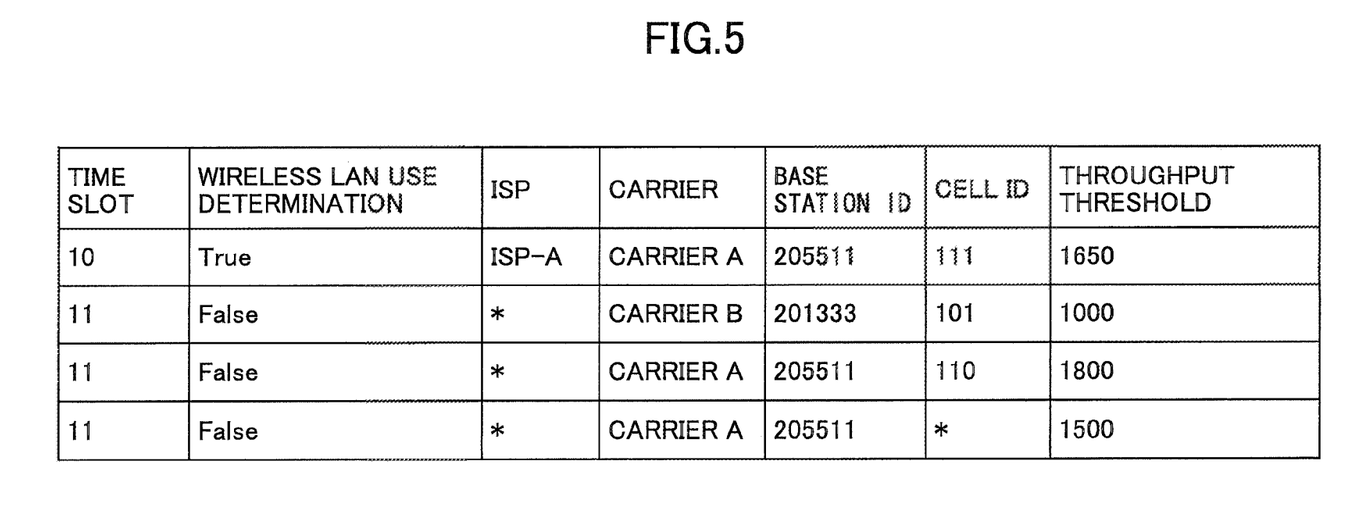
FIG. 5 is a diagram illustrating an example of data stored in a reference quality DB 103.

FIG. 5 is a diagram illustrating an example of data stored in the reference quality DB 103. In the example illustrated in FIG. 5, throughput is adopted as an indicator of communication quality, and throughput thresholds are stored, each of which is associated with a communication environment information tuple.

In the example in FIG. 5, in the case where a communication environment information item of, for example, <time slot=10, wireless LAN use determination=True, ISP=ISP-A, carrier=carrier A, base station ID=205511, cell ID=111> is input into the reference quality DB 103, the reference quality DB 103 responds with 1650 as the throughput threshold. Also, in the case where <time slot=11, wireless LAN use determination=False, ISP=*, carrier=carrier A, base station ID=205511, cell ID=111> is input, since no condition exists that matches completely, the reference quality DB 103 responds with 1800, which is a result obtained by treating the condition of "cell ID" as a don't-care term.

When a viewing session of a video is completed on the audio-visual terminal 200, then, the time, the session ID, the communication environment information, and the communication quality information of the viewing session of the video are stored as a tuple in the accumulated quality DB 102.

Figure 6:
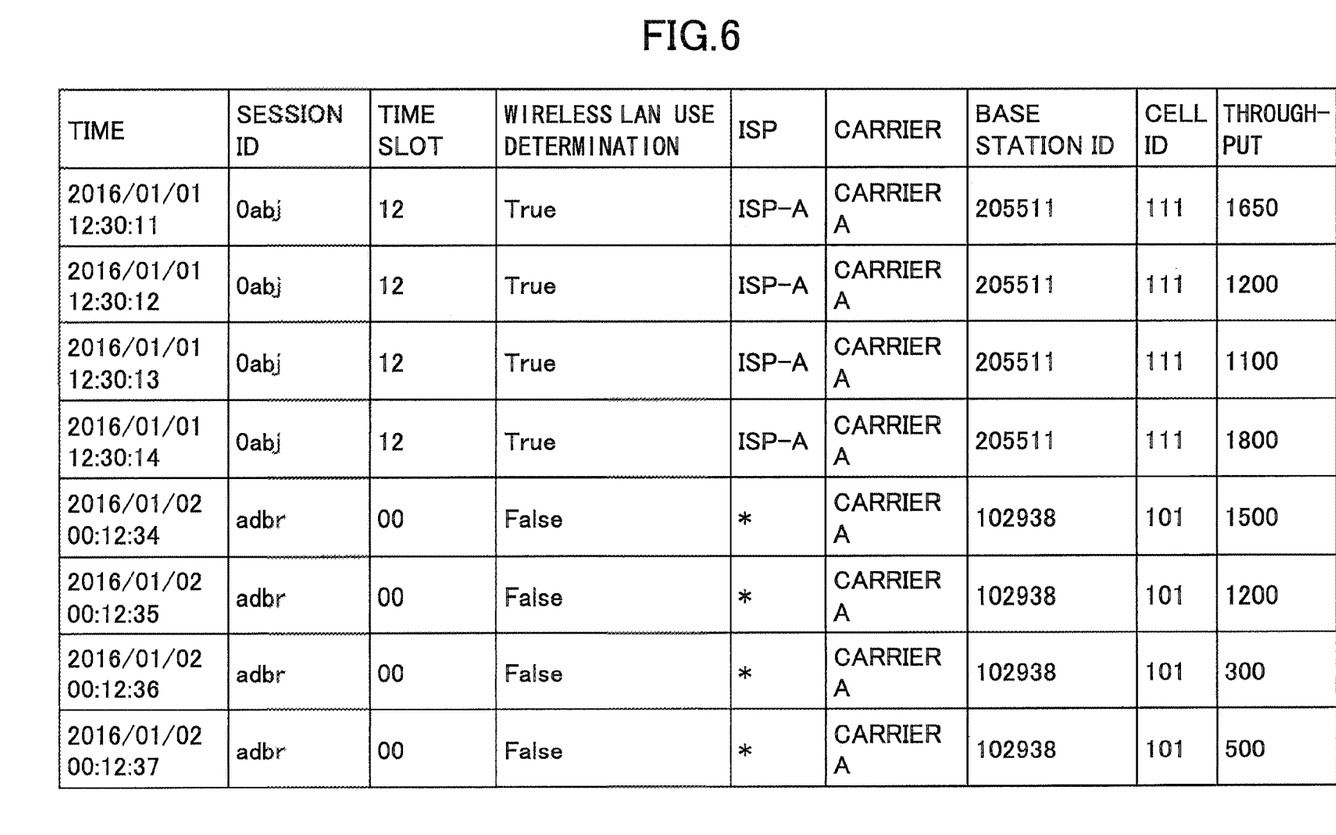
FIG. 6 is a diagram illustrating an example of data stored in an accumulated quality DB 102.

FIG. 6 is a diagram illustrating an example of data stored in the accumulated quality DB 102. In the example in FIG. 6, results of throughput measurement are stored that include, for example, four results at one-second intervals for a viewing session having the session ID of 0abj (unique value to the viewing session).

The reference quality DB updater 101 obtains, from the accumulated quality DB 102, communication quality information items having the same communication environment, to calculate a communication quality threshold from the obtained communication quality information items. For example, a statistic (mean, median, or the like) of the communication quality information items having the same communication environment may be set as the communication quality threshold.

More specifically, for example, the reference quality DB updater 101 may calculate, for each session ID, the mean of a sequence of items (e.g., rows shown in FIG. 6) whose predetermined number of elements among time slot, wireless LAN use determination, ISP, carrier, base station ID, and cell ID are coincident with each other in the accumulated quality DB 102, to set the mean of the calculated means of the session IDs as the communication quality threshold. Here, the "predetermined number" may be set to cover all of time slot, wireless LAN use determination, ISP, carrier, base station ID, and cell ID; or may be set to a number less than the all (a number greater than or equal to 1). For example, suppose that a sequence has eight items whose predetermined number (defined in advance) of elements are coincident with each other, and among these, three items have the session ID=ID-A, and five items have the session ID=ID-B. In this case, "the mean of the means of the session IDs" corresponds to the mean of the mean of the three items having the session ID=ID-A, and the mean of the five items having the session ID=ID-B.

Alternatively, the median of the means of the session IDs may be set as the communication quality threshold, instead of "the mean of the means of the session IDs".

Then, the reference quality DB updater 101 stores the calculated communication quality threshold in the reference quality DB 103 as the communication quality threshold in the communication environment (a communication environment having the coincident elements). This update process is executed, for example, once a day by using a timer or the like.

(Pacing Control)

Next, pacing control in the audio-visual terminal 200 will be described.

When the user starts viewing a video, the pacing controller 202 first obtains current communication environment information of the audio-visual terminal 200, and transmits the communication environment information to the network quality responder 100. The network quality responder 100 refers to the reference quality DB 103, and responds with a communication quality threshold $Th_s$ that corresponds to the communication environment. The pacing controller 202 also obtains information of the current buffered amount that has been accumulated from the video playback unit 204.

Figure 7:
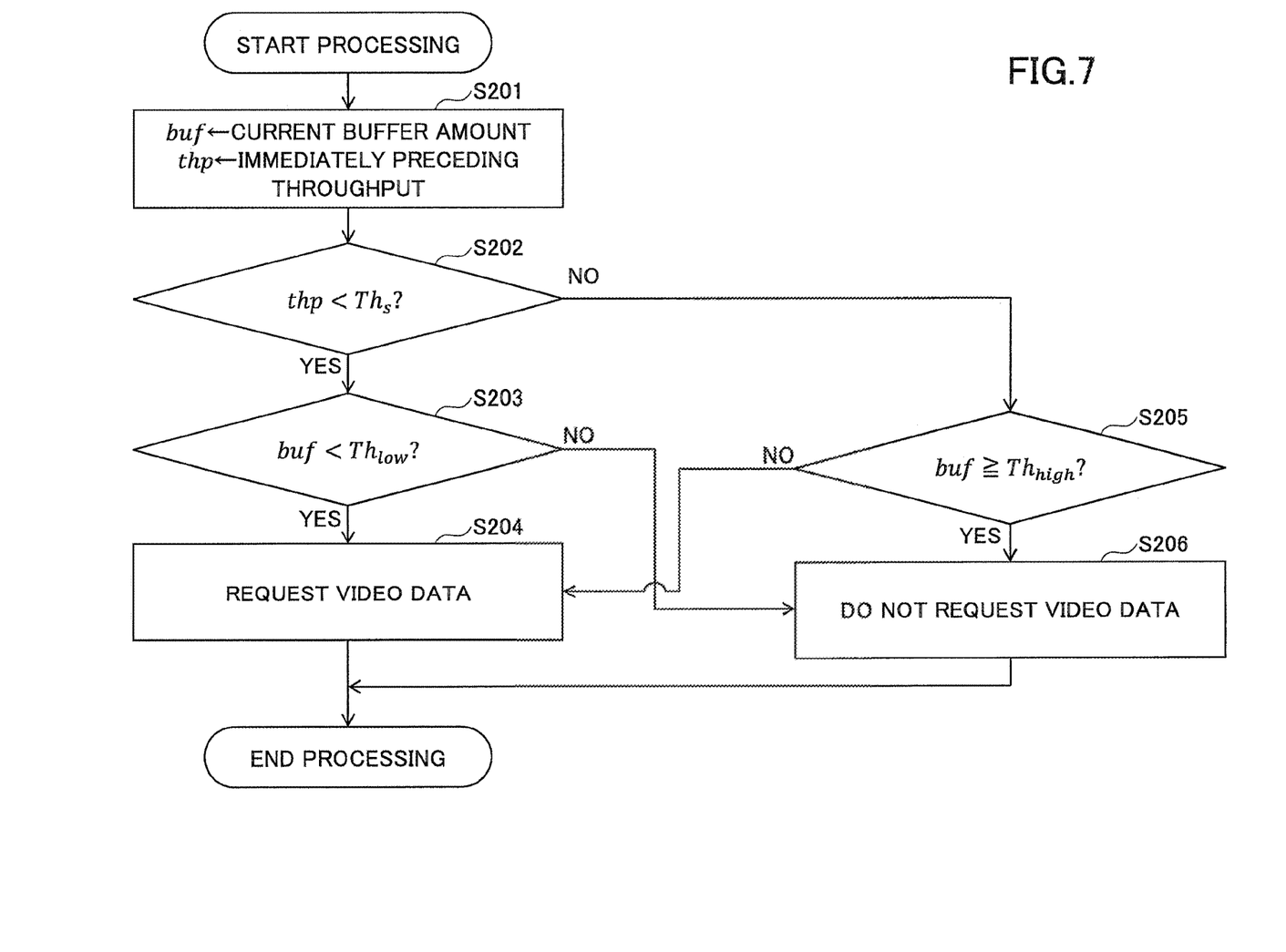
FIG. 7 is a flowchart of a process of a pacing controller 202.

Then, the pacing controller 202 determines whether to make a request for the video data at this moment following a flow illustrated in FIG. 7. In this flow, in addition to the communication quality threshold $Th_s$ described above, thresholds $Th_{low}$ and $Th_{high}$ related to the buffered amount are used, which are defined in advance. These thresholds are stored in advance in the memory or the like of the audio-visual terminal 200. Note that the flow in FIG. 7 is repeatedly executed during a video viewing session at regular time intervals.

At Step S201, the current buffered amount is set to a variable buf, and the latest communication quality (here, the throughput) is set to a variable thp. Note that the latest communication quality may be regarded as the current communication quality.

At Step S202, the pacing controller 202 determines whether the communication quality thp is less than the communication quality threshold $Th_s$. In the case where the communication quality thp is less than the communication quality threshold $Th_s$, the process proceeds to Step S203, to determine whether the buffered amount buf is less than the threshold $Th_{low}$. If the buffered amount buf is less than the threshold $Th_{low}$, the process proceeds to Step S204, and the pacing controller 202 makes a request for the video data to the video distributor 300.

At Step S203, if the buffered amount buf is greater than or equal to threshold $Th_{low}$, the process proceeds to Step S206, and the pacing controller 202 does not make a request for the video data to the video distributor 300.

On the other hand, if the communication quality thp is greater than or equal to the communication quality threshold $Th_s$ at Step S202, the process proceeds to Step S205 to determine whether the buffered amount buf is greater than or equal to the threshold $Th_{high}$. If the buffered amount buf is greater than or equal to the threshold $Th_{high}$, the process proceeds to Step S206, and the video data is not requested. Alternatively, if the buffered amount buf is less than the threshold $Th_{high}$, the process proceeds to Step S204, and the video data is requested.

In other words, in principle, if the current communication quality is less than the communication quality threshold $Th_s$, the video data is not requested; or if it is greater than or equal to the communication quality threshold $Th_s$, the video data is requested. However, even if the current communication quality is less than the communication quality threshold $Th_s$, if the current buffered amount is less than or equal to the threshold $Th_{low}$, the video data is requested. Also, even if the current communication quality is greater than or equal to the communication quality threshold $Th_s$, if the current buffered amount is greater than or equal to threshold $Th_{high}$, the video data is not requested.

The thresholds $Th_{low}$ and $Th_{high}$ described above are thresholds given in advance to the audio-visual terminal 200, which may be set, for example, by an operator of a video service at his/her disposal. For example, setting both $Th_{low}$ and $Th_{high}$ to great values raises likelihood that YES is taken at S203 in FIG. 7, and raises likelihood that NO is taken at S205, and thereby, the video data is highly likely to be requested. This enables to perform control with which stalling during a playback can be avoided as much as possible. Also, setting $Th_{high}$ to a rather small value may result in taking YES at S205, and thereby, the video data tends not to be requested. This enables to reduce the amount of traffic that would be useless if the viewing session stalls.

Note that the value to be compared with the communication quality threshold $Th_s$ does not necessarily need to be the latest communication quality, and may be any value as long as it is a statistic calculated from several items in the latest sequence. For example, supposing that the communication quality in a latest sequence is the throughput "1800" of "2016/01/01 12:30:14" illustrated in FIG. 6, this "1800" may be used, or another statistic may be used, for example, the mean or the median of the latest several items (assuming three items) of "1800", "1100", and "1200".

Implementation is available in video players today, which enables to adjust video data by adjusting two thresholds to be set. Adding the functions related to the communication quality according to the present embodiment to such implementation makes it possible to perform the control described above. Paying attention to the process related to comparison between the buffered amount and the thresholds, and denoting these respective thresholds by $Th_a$ and $Th_b$, the video data is requested consecutively until reaching $Th_a$, and once reached, the buffered amount decreases, and the following video data will not be requested until reaching $Th_b$. Therefore, according to the above algorithm, it is simply necessary to set $Th_a=Th_{high}$ and $Th_b=Th_{low}$ when requesting the video data, and to set $Th_a=Th_{low}$ and $Th_b=Th_{low}$ when not requesting the video data.

Also, in a framework of the adaptive bitrate, which is assumed to be used in video distribution according to the present embodiment, when requesting video data, it is possible to select image quality. Even so, the algorithm in the present embodiment specializes in adjusting the request timing of a video, and does not limit the image quality to be requested. Therefore, the algorithm can be combined with any of existing image quality selection algorithms, to be used.

Furthermore, the communication quality threshold $Th_s$ used in the present embodiment is not limited to a value obtained as a response from the network quality responder 100; and the value may be updated sequentially using information obtained from a current session under the pacing control. For example, it is possible to update the threshold by $Th_s=\alpha Th_s+(1-\alpha)thp$ where α thp where a represents a real number greater than or equal to 0 and less than or equal to 1, and thp represents the mean of the communication quality in the current session (e.g., the mean of three throughput values as described above).

Also, when determining whether to make a request for video data, bit rate information provided for the video data may be used. For example, consider a case where the throughput is adopted as the communication quality, and assume for a certain video that the maximum of the provided bit rates is 1000 k bps, $Th_s$=2000 k bps, thp=1800 k bps, and buf<$Th_{high}$. In this case, according to the above algorithm, a request for the video data is not made. However, comparing the maximum provided bit rate $br_{max}$ with thp, a sufficient throughput is achieved, and hence, it is hardly likely that the average bit rate falls even if the reception is executed. Therefore, the algorithm may be modified to execute reception in such a case so that the average bit rate is likely to be improved. This process can be implemented by modifying the algorithm in which after it has been determined NO at Step S203, $br_{max}$ is compared with thp, and the video data is not requested if $br_{max}$ is greater; or the video data is requested if thp is greater.

In other words, in the case where the communication quality thp is lower than the threshold $Th_s$, the pacing controller 202 compares the maximum bit rate $br_{max}$ provided for the video data with the communication quality thp, and does not make a request for the video data if the maximum bit rate $br_{max}$ is greater than the communication quality thp; or makes a request for the video data if the communication quality thp is greater than the maximum bit rate $br_{max}$. However, even if the maximum bit rate $br_{max}$ is greater than the communication quality thp, if the current buffered amount buf is less than or equal to the threshold $Th_{low}$, the pacing controller 202 makes a request for the video data; and even if the communication quality thp is greater than the maximum bit rate $br_{max}$, if the current buffered amount buf is greater than or equal to threshold $Th_{high}$, the pacing controller 202 does not make a request for the video data.

(Update of Accumulated Quality DB 102)

When performing reception and a playback of video data, the video playback unit 204 in the audio-visual terminal 200 periodically measures the communication quality (e.g., the throughput) in the current communication environment, and accumulates the measured data in the communication quality accumulation DB 203.

The communication quality accumulation DB 203 continues to accumulate the communication quality information sent from the video playback unit 204, along with time information during a video playback. Then, when the video playback is completed, the communication quality reporter 201 makes an inquiry to the communication quality accumulation DB 203, and stores the communication quality information obtained by the inquiry in the accumulated quality DB 102. An example of data stored in the accumulated quality DB 102 is as already illustrated in FIG. 6. As described above, the stored data is used when updating the reference quality DB 103.

However, accumulation of the communication quality information in the accumulated quality DB 102 does not necessarily need to be executed by the scheme described above. For example, an application that obtains the communication quality information may be activated in the background on the audio-visual terminal 200, to transmit information collected by the application to the accumulated quality DB 102.

Effects of Embodiment

The technology of the present embodiment enables to view and listen to a video by an encoding bit rate higher than that obtained by the existing method on the average, while preventing a playback from stalling halfway. Assuming that the number of playback stallings and the playback time are fixed, if the encoding bit rate becomes higher, the physically sensed quality improves in general. Therefore, the technology according to the present embodiment enables to improve the physically sensed quality when viewing and listening to a video.

Summary of Embodiment

As described above, according to the present embodiment, a pacing control device is provided to perform pacing control on a content distributed from a content distribution device that performs streaming-based content distribution. The pacing control device includes an obtainer configured to obtain a communication quality threshold that corresponds to a communication environment in the pacing control device; and a controller configured not to make a request for the content to the content distribution device in a case where a communication quality in the pacing control device is lower than the communication quality threshold, and to make the request for the content to the content distribution device in a case where the communication quality is higher than the communication quality threshold.

Note that the pacing controller 202 described in the embodiment is an example of an obtainer and a controller.

The pacing control device may further include a playback unit to play back the content, wherein even in the case where the communication quality is lower than the communication quality threshold, in a case where a buffered amount of the content in the playback unit is less than a first threshold, the controller makes the request for the content to the content distribution device, and wherein even in the case where the communication quality is higher than the communication quality threshold, in a case where the buffered amount of the content in the playback unit is greater than a second threshold, the controller does not make the request for the content to the content distribution device.

Also, in the case where the communication quality is lower than the communication quality threshold, the controller may compare a maximum bit rate provided for the content with the communication quality, so as not to make the request for the content in a case where the maximum bit rate is greater than the communication quality, and so as to make the request for the content in a case where the communication quality is greater than the maximum bit rate.

The obtainer may obtain the communication quality threshold corresponding to the communication environment in the pacing control device, from a network quality responder that holds one or more communication quality thresholds associated with respective communication environments.

A communication quality reporter may be further provided to transmit a communication quality measured in the pacing control device to the network quality responder, wherein the network quality responder calculates the communication quality threshold based on the transmitted communication quality.

The present invention is not limited to the above embodiments, and various changes and applications can be made within the scope of the claims.

The present patent application claims priority based on Japanese Patent Application No. 2016-034730, filed on Feb. 25, 2016, and the entire contents of the Japanese Patent Application No. 2016-034730 are incorporated herein by reference.

LIST OF REFERENCE SYMBOLS

100 network quality responder
101 reference quality DB updater
102 accumulated quality DB
103 reference quality DB
150 drive unit
152 auxiliary storage unit
153 memory unit
154 CPU
155 interface unit
156 display
157 input unit
200 audio-visual terminal
201 communication quality reporter
202 pacing controller
203 communication quality accumulation DB
204 video playback unit
300 video distributor
301 video data DB
302 video distributor
400 network

The invention claimed is:

1. A pacing control device to perform pacing control on a content distributed from a content distribution device that performs streaming-based content distribution, the pacing control device comprising:
   an obtainer configured to obtain a communication quality threshold that corresponds to a communication environment in the pacing control device; and
   a controller configured not to make a request for the content to the content distribution device in a case where a communication quality in the pacing control device is lower than the communication quality threshold, and to make the request for the content to the content distribution device in a case where the communication quality is higher than the communication quality threshold.

2. The pacing control device as claimed in claim 1, wherein the pacing control device further includes a playback unit to play back the content,
   wherein even in the case where the communication quality is lower than the communication quality threshold, in a case where a buffered amount of the content in the playback unit is less than a first threshold, the controller makes the request for the content to the content distribution device, and
   wherein even in the case where the communication quality is higher than the communication quality threshold, in a case where the buffered amount of the content in the playback unit is greater than a second threshold, the controller does not make the request for the content to the content distribution device.

3. The pacing control device as claimed in claim 1, wherein in the case where the communication quality is lower than the communication quality threshold, the controller compares a maximum bit rate provided for the content with the communication quality, so as not to make the request for the content in a case where the maximum bit rate is greater than the communication quality, and so as to make the request for the content in a case where the communication quality is greater than the maximum bit rate.

4. The pacing control device as claimed in claim 1, wherein the obtainer obtains the communication quality threshold corresponding to the communication environment in the pacing control device, from a network quality responder that holds one or more communication quality thresholds associated with respective communication environments.

5. The pacing control device as claimed in claim 4, further comprising:

a communication quality reporter configured to transmit a communication quality measured in the pacing control device to the network quality responder, wherein the network quality responder calculates the communication quality threshold based on the transmitted communication quality.

6. A pacing control method executed by a pacing control device to perform pacing control on a content distributed from a content distribution device that performs streaming-based content distribution, the pacing control method comprising:

an obtaining step of obtaining a communication quality threshold that corresponds to a communication environment in the pacing control device; and a controlling step of not making a request for the content to the content distribution device in a case where a communication quality in the pacing control device is lower than the communication quality threshold, and making a request for the content to the content distribution device in a case where the communication quality is higher than the communication quality threshold.

7. The pacing control method as claimed in claim 6, wherein the pacing control device further includes a playback unit to play back the content, wherein even in the case where the communication quality is lower than the communication quality threshold, in a case where a buffered amount of the content in the playback unit is less than a first threshold, the controlling step makes the request for the content to the content distribution device, and wherein even in the case where the communication quality is higher than the communication quality threshold, in a case where the buffered amount of the content in the playback unit is greater than a second threshold, the controlling step does not make the request for the content to the content distribution device.

8. A non-transitory computer-readable recording medium including a program stored therein for causing a computer to execute the pacing control method as claimed in claim 6.

* * * * *